April 2, 1968

T. REPPER, JR 3,375,941

ARTICLE TRANSFER MECHANISM

Filed Feb. 18, 1966

INVENTOR
THEODORE REPPER, JR.
BY Raphael Semmes
ATTORNEY

INVENTOR
THEODORE REPPER, JR.
BY Raphael Semmes
ATTORNEY

April 2, 1968 T. REPPER, JR 3,375,941
ARTICLE TRANSFER MECHANISM
Filed Feb. 18, 1966 4 Sheets-Sheet 4

INVENTOR
THEODORE REPPER, JR.
BY *Raphael Semmes*
ATTORNEY

United States Patent Office 3,375,941
Patented Apr. 2, 1968

3,375,941
ARTICLE TRANSFER MECHANISM
Theodore Repper, Jr., 505 Middletown Federal Savings &
Loan Bldg., Middletown, Ohio 45042
Filed Feb. 18, 1966, Ser. No. 528,456
4 Claims. (Cl. 214—26)

ABSTRACT OF THE DISCLOSURE

A transfer device for use in a rolling mill operation for extracting slabs from the laterally spaced support bars of a holding furnace and depositing them on a conveyor having a series of laterally spaced rollers which are also spaced longitudinally from the support bars. The device comprises a transfer unit having a set of arms parallel with said bars and rollers and laterally spaced for sequential insertion between the spaced support bars and withdrawal therefrom for insertion between the spaced rollers. Means are provided for reciprocating the transfer unit to and from the holding furnace and associated means for elevating the transfer arms while interposed between the spaced support bars to lift a slab therefrom and sequentially lower the arms when shifted to positions between the spaced conveyor rollers to deposit the extracted slabs on the latter.

---

This invention relates to the handling of slabs in the operation of a steel rolling mill or the like. More particularly, the invention consists in new and useful improvements in slab extracting mechanism for rolling mill holding furnaces of the type conventionally used at predetermined points along a slab conveyor line in a rolling mill.

In the operation of steel rolling mills, steel ingots are initially rolled into elongated, rectangular slabs which are cut in predetermined lengths and deposited on a conveyor system. These slabs are then shifted from the conveyor system and placed in holding furnaces to maintain the required temperature until subsequent delivery to further rolling mechanism for final rolling into sheets.

The extraction of these slabs from the holding furnaces for delivery by a conveying system to the final rolling operation has, in the past, created something of a problem, due to the temperature of the slabs and the difficulty of handling.

It is therefore the primary object of the present invention to provide a mechanism, associated with a holding furnace, for the extraction of the hot slabs and the depositing thereof on a conveyor for delivery to further operations.

Another object of the invention is to provide apparatus of this type designed to bodily lift hot slabs from a support in a holding furnace and mechanically shift them to an adjacent conveyor system, with a minimum of effort.

A further object of the invention is to provide a series of extracting arms which are collectively pivotally mounted for projection into and retraction from a holding furnace beneath a slab retained therein, and including means to effect partial elevation of said arms to engage and support a slab for extraction.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1:
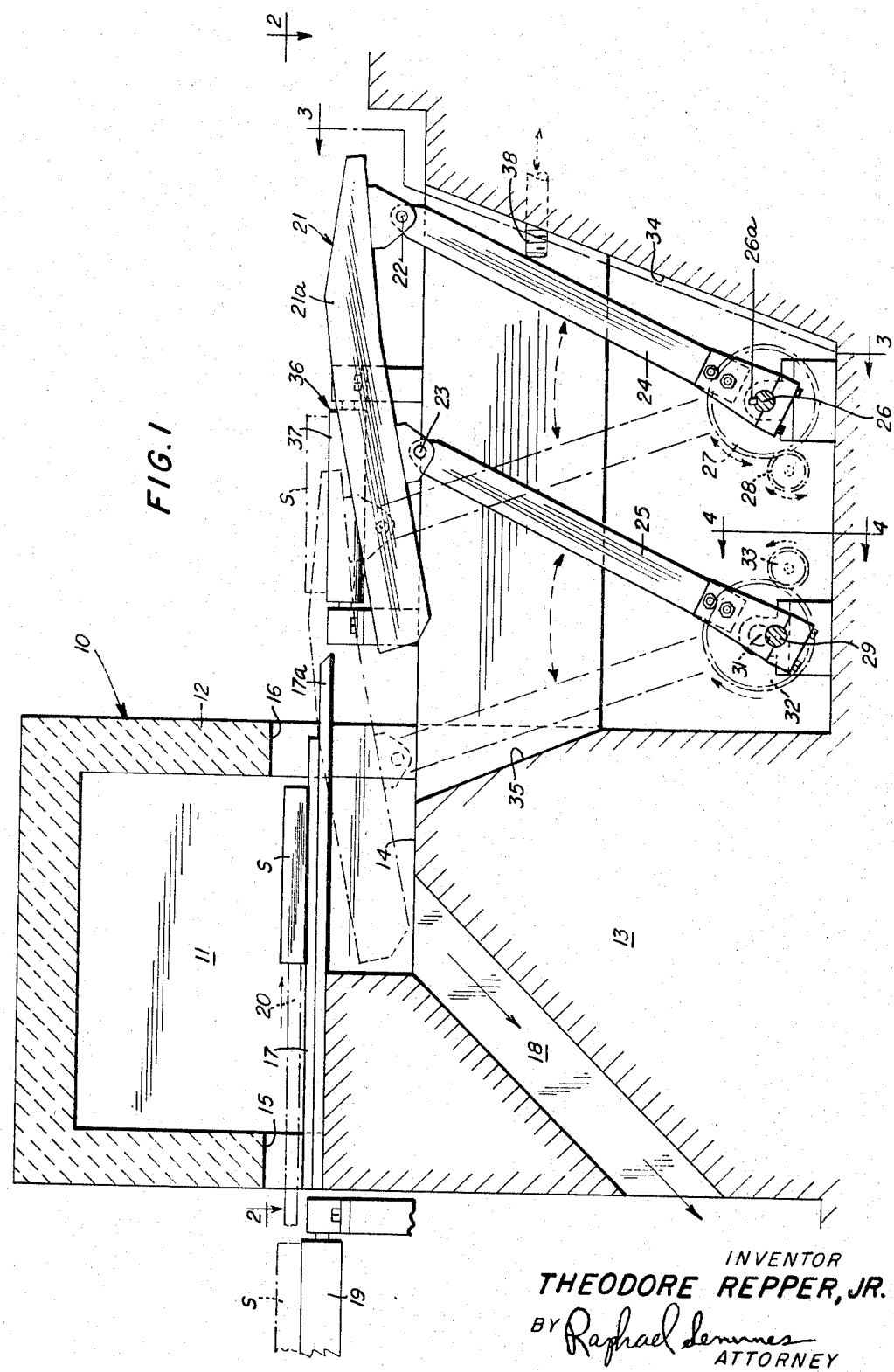
FIG. 1 is a view partly in section and partly in elevation showing the extracting arm assembly and its relation to the holding furnace.

In the drawings, referring first to FIG. 1, a holding furnace is generally indicated by the numeral 10 and comprises a heating chamber 11 bounded by a suitable housing or enclosure 12 of refractory material, such as fire brick. The particular structure and heating system of the holding furnace per se forms no part of the present invention, and for purposes of illustration is shown as being mounted on a foundation or base 13 which supports the heating chamber 11 proper, the forward end of the base being provided with an inwardly directed cavity 14, opening at the front of the base. As will later appear, this cavity is designed to accommodate the projection and retraction of the extractor arms with respect to the holding furnace.

Elongated, relatively narrow, openings 15 and 16 extend across the rear and front walls, respectively, of the housing 12 to accommodate the passage of slabs S into and out of the chamber 11. A series of parallel supporting rails 17 are arranged in laterally spaced relation in the lower portion of the chamber 11, with their opposite ends extending through the respective openings 15 and 16 and their forward ends 17a projecting beyond the outer face of the housing 12. Sufficient space is provided between the upper surfaces of the rails and the upper extremities of the openings 15 and 16 to permit the through passage of the slabs S.

Any suitable heating system may be employed for maintaining the proper temperature in chamber 11, and, preferably, a scale disposal shaft or passageway 18 communicates with the cavity 14 for removal of accumulated scale. Although not shown in the drawings, a suitable door is preferably provided at the bottom of the shaft 18 which may be periodically opened for this scale removal.

A conventional conveyor system comprising conveyor rolls 19 is arranged immediately adjacent the inlet opening 15 in the rear of housing 12, with the roller peripheries aligned with the upper surfaces of the rails 17. Thus, by any suitable means, such as a feed arm 20, when the slabs S arrive adjacent the opening 15, they may be pushed into the chamber 11 where they are supported on the rails 17 until extracted, as will be described.

The extraction mechanism, generally indicated by the numeral 21, comprises a series of laterally spaced, parallel extractor arms 21a, pivotally supported as at 22 and 23 on the upper ends of an actuating lever 24 and an elevating lever 25, respectively. The lower extremities of each actuating lever 24 are mounted on a drive shaft 26 to which they are keyed, as at 26a or otherwise operatively connected, and one end of this shaft 26 carries a gear 27 which meshes with a drive gear 28, operated from any source of power. Preferably, the drive mechanism for this shaft 26 is of such nature as to permit the selective rotation of the shaft 26 in either clockwise or counterclockwise direction.

Figure 2:
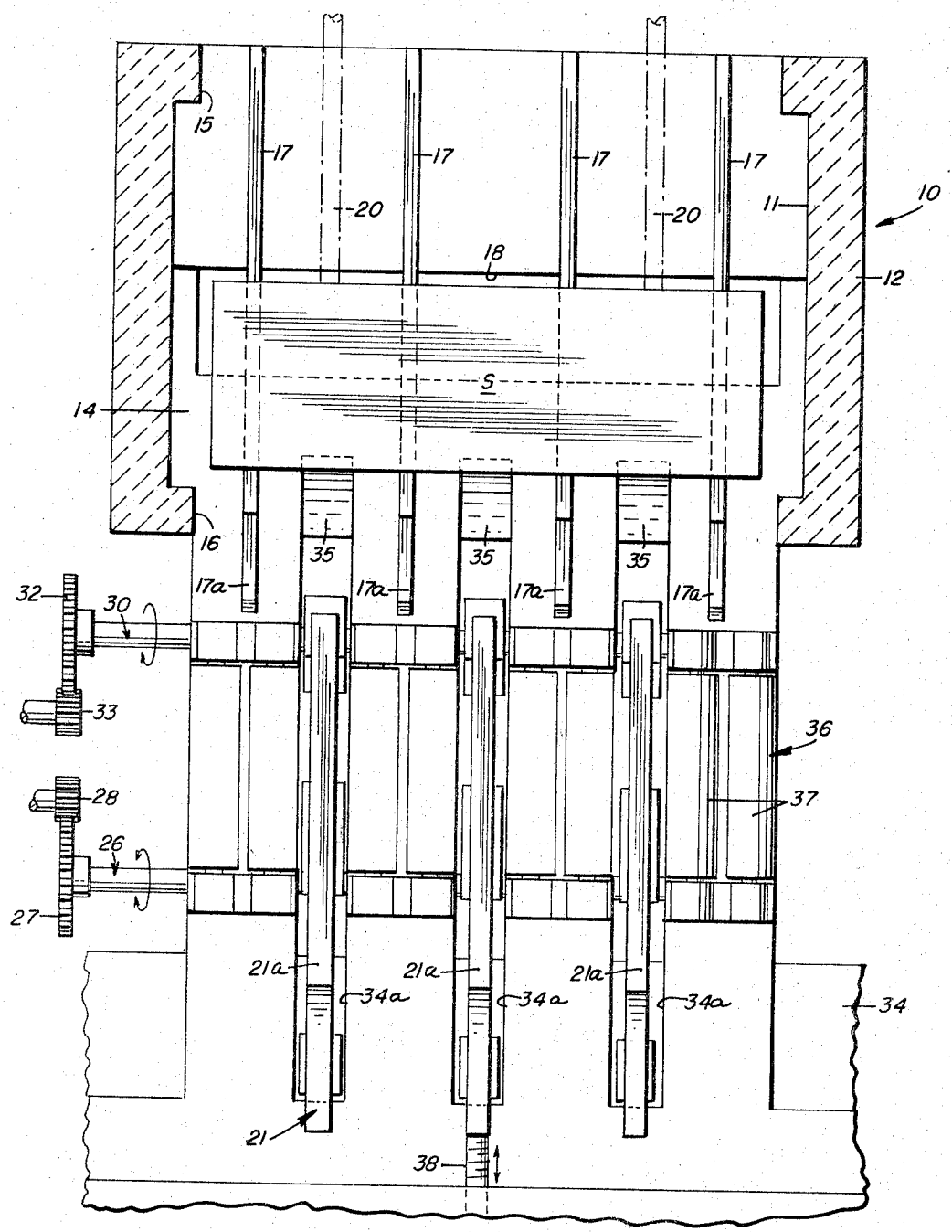
FIG. 2 is a similar view taken on line 2—2 of FIG. 1, looking down on the extraction mechanism.
Figure 4:
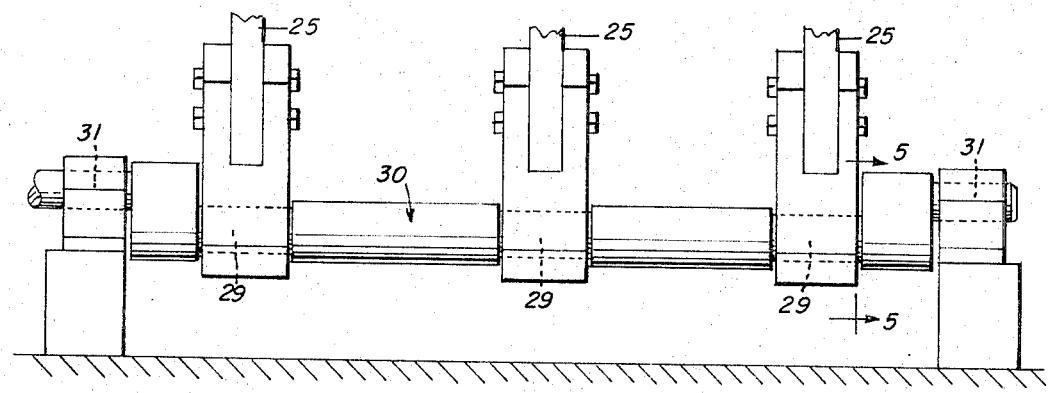
FIG. 4 is an enlarged detail of the eccentric elevating mechanism for the extractor arms, taken on line 4—4 of FIG. 1.
Figure 5:
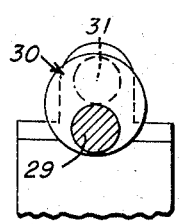
FIG. 5 is a sectional view taken on line 5—5 of FIG. 4, showing the elevating cam in its lowermost position.
Figure 6:
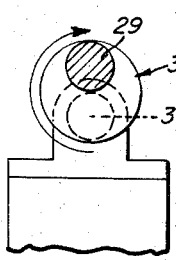
FIGURE 6 is a similar view showing the cam in its uppermost position.

As best seen in FIG. 4, the lower end of each of the elevating levers 25 is eccentrically mounted as at 29 on a crankshaft 30, opposite ends of which are journalled as at 31 on suitable supports. One end of the crankshaft 30 carries a drive gear 32, as seen in FIG. 2, which, in turn, is driven by a gear 33, actuated from any suitable source of power. This latter drive mechanism for the crankshaft 30 is preferably of the type which will rotate the shaft in one direction only, as a complete rotation of the shaft 30 will cause the eccentric mountings of the levers 25 to undergo a complete cycle for the sequential elevation and lowering of the extractor arms, as will later appear.

Immediately forward of the holding furnace 10, the foundation 13 is provided with a well 34, within which the transfer mechanism 21 is mounted for reciprocation. The rear wall 35 of the well 34, adjacent the holding furnace, is preferably inclined to accommodate the elevating levers 25 at the limit of their reciprocating motion toward the holding furnace, as shown in dotted lines in FIG. 1.

A conveyor system, generally indicated by the numeral 36 and preferably comprising a series of conveyor rolls 37, overlies the top opening of the well 34, adjacent the furnace discharge opening 16. As illustrated, these rolls 37 are arranged in pairs on axes parallel with the longitudinal axes of the rails 17 in the holding furnace. Each pair of rolls is separated from the adjacent pair to accommodate one set of bars 24–25 as the transfer unit 21 is reciprocated. Also, the rolls 37 are preferably so mounted that their peripheries lie in a plane slightly below the planes of the supporting rails 17 in the holding furnace.

Preferably, an adjustable stop means, such as the threaded rod 38, is provided for limiting the forward reciprocating movement of the transfer unit, as seen in FIG. 1.

Figure 3:
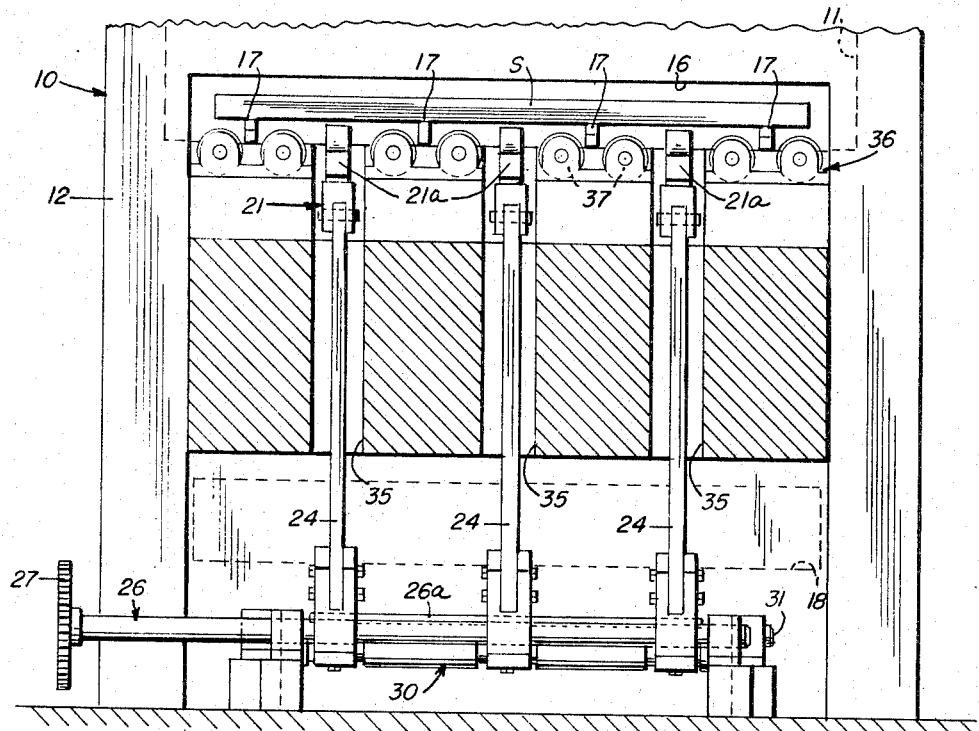
FIG. 3 is a view taken on line 3—3 of FIG. 1.

The well 34 in the base 13 may be a completely open well, although, preferably, as shown in the drawings (FIGS. 2 and 3), a plurality of wells or individual clearance slots 34a may be employed to respectively accommodate the reciprocation of the bars 24 and 25.

In operation, the hot slabs S are fed on conveyor rolls 19, which, as before stated, are operated by any conventional means, until they arrive adjacent the inlet opening 15 of the holding furnace 10. At this point, they are pushed into the chamber 11 by a feeding arm 20 and rest upon the supporting rails 17 where their temperature is maintained at the desired degree. In order to extract the slabs from the chamber 11 for placement on the conveyor system 36 for continued rolling, the drive shaft 26 is first rotated by gears 27 and 28 in counterclockwise direction, as seen in FIG. 1. This causes the arms 21a to be moved inwardly in an arc until their inner ends are fully projected into the cavity 14, beneath the rails 17. During this arcuate movement of the arms 21a, their inner ends, which are pivotally supported by the elevating levers 25, remain in their lowermost positions due to the fact that the eccentric mountings 29 supporting the lower ends of the levers 25 are in their lowermost positions, so that the inner ends of the arms 21a are below and out of contact with the slabs resting on the rails 17.

Figure 7:
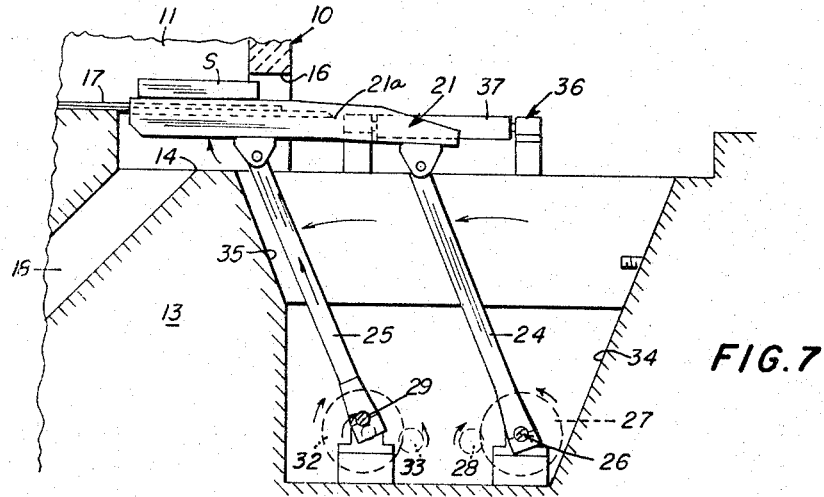
FIG. 7 is a view showing the extractor arms and supports in side elevation, and in elevated position beneath a slab in the holding furnace.

As previously pointed out, this arcuate movement of the arms 21a is accomplished by the spacing of the pairs of rolls 37 and the supporting rails 17 so that the arms freely intersect the planes of both the rolls and the rails. With the arms projected into the cavity 14 in the position shown in dotted lines in FIG. 1, power is applied to the gears 32–33 to rotate the crankshaft 30 in either direction, whereupon, as shown in FIG. 7, after the eccentric mountings 29 have been rotated 180°, the levers 25 have been correspondingly shifted longitudinally to elevate the inner ends of the arms 21a. These arms have now passed through the spaces between the rails 17 and engage the undersurface of the slab S, lifting it from the rails and supporting it entirely on the arms 21a.

Figure 8:
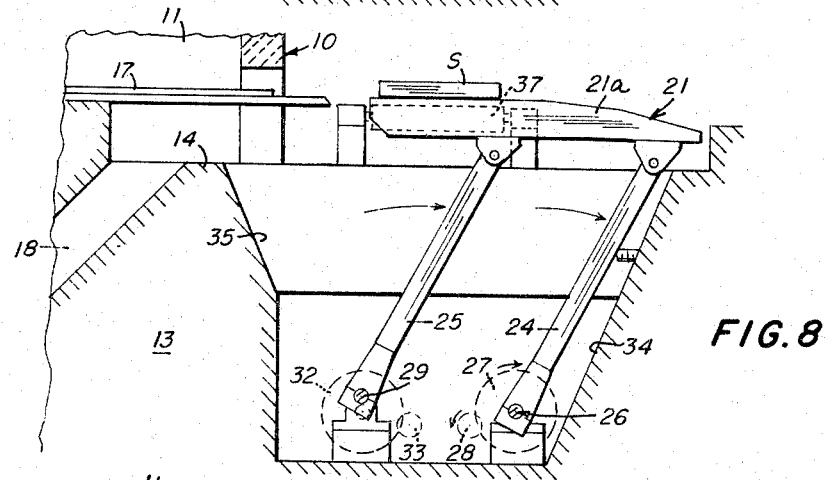
FIG. 8 is a similar view showing the extractor arms after retraction from the holding furnace.
Figure 9:
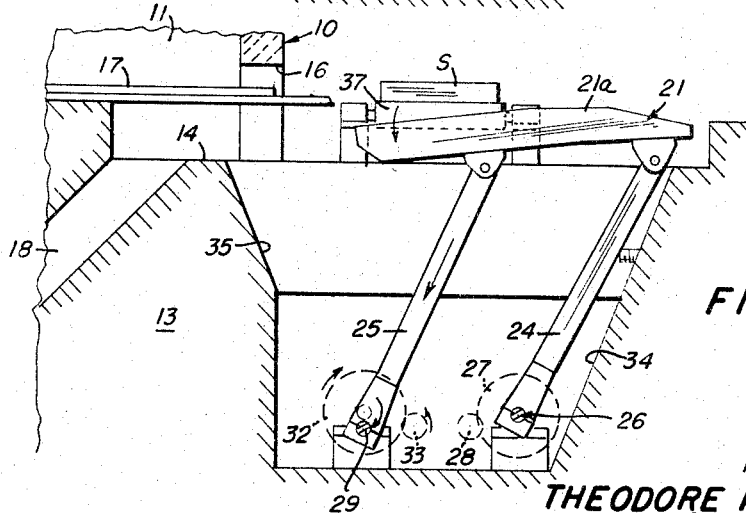
FIG. 9 is a similar view showing the extractor arms in lowered position with the slab deposited upon conveyor rolls.

Power is now applied through gears 27 and 28 to rotate the lever 24 in clockwise direction which retracts the arms 21a from the holding furnace with the slab supported still in elevated position thereon, as shown in FIG. 8. Now, by continuing the rotation of the gears 32–33, the elevating levers 25 are lowered through the spaces between the rolls 37 so that the slab is deposited on the tops of these conveyor rolls for subsequent transfer to the continued rolling operation. As in the case of the conveyor rolls 19, the rolls 37 may be driven by any suitable means.

It may be noted that if for any reason after the slabs are deposited on the conveyor rolls 37 it is desired to replace the slabs in the holding furnace chamber 11, this may be accomplished by reversal of the procedure just described.

In other words, the elevating levers 25 are raised through the operation of the crankshaft 30 so as to lift the slabs from the rolls 37, after which the counterclockwise rotation of the levers 24 will cause the slabs to be redeposited in the oven in the position shown in FIG. 7.

For purposes of illustration, the drawings and the foregoing description have been confined to three extractor arms and supports. However, it should be noted that the number of extractor arms and supports to be employed with this invention may be increased or decreased, depending on the length of the slabs being handled and the particular arrangement of any given furnace.

Also, although not shown in the drawings, existing holding furnaces are provided with doors at both the front and rear of the furnace which may be elevated to provide openings through which the slabs may pass into and out of the furnace. With the present invention, suitable doors or curtains should be arranged in the area where the transfer arms operate. These are preferably hung vertically, to be opened when the mechanism is in operation, and closed when the mechanism is inactive, in order to retain the heat in the furnace. However, as the door mechanisms form no part of the invention per se, they are not shown nor described in detail.

While the present invention has been described as primarily adapted for use in connection with a holding furnace of a steel rolling mill operation, it is to be noted that its principle of operation may be employed with equal effect in various article handling systems requiring the automatic transfer of articles or material from one location to another where a minimum of manual effort is of importance.

From the foregoing, it is believed that the invention may be readily understood by those skilled in the art without further description, it being borne in mind that numerous changes may be made in the details disclosed without departing from the spirit of the invention as set forth in the following claims.

I claim:
1. Article transfer mechanism comprising adjacent first and second article supporting units, each consisting of a series of laterally spaced supports, the supports of both units being parallel and each longitudinally spaced with respect to those of the other unit, a pivotally mounted article transfer unit having a series of laterally spaced, parallel transfer arms collectively aligned for arcuate reciprocation between the spaced supports of respective supporting units about an axis perpendicular to the longitudinal axes of said supports for interleaved movement from one unit to the other, the positions of the arms of said transfer unit at the extremes of their arcuate path being normally below the upper planes of the supports of respective supporting units, means for reciprocating said transfer unit, and means for selectively elevating and lowering the arms of said transfer unit in interleaved relation to the supports of said supporting units to intersect said upper planes for engagement and disengagement with an article resting on one of said supporting units, whereby said article may be lifted from said one supporting unit and deposited on the other, the respective arms of said transfer unit being pivotally connected at longitudinally spaced points to the upper ends of first and second series of levers, the lower ends of said levers being pivotally mounted on correspondingly spaced first and second shafts, said first shaft being keyed to said first series of levers for reciprocating the latter, and, in turn, said transfer arms, reversible means for rotating said first shaft, said second series of levers being eccentrically connected on a common axis to said second shaft, the pivotal connection of said arms to the levers of said first series acting as a common fulcrum therefor, and means for selectively rotating said second shaft, whereby said second series of levers may be shifted longitudinally to elevate or lower said transfer arms with respect to the supports of said supporting units.

2. Mechanism as claimed in claim 1, in combination with a steel rolling mill holding furnace having aligned inlet and outlet openings for transferring hot slabs from said furnace, wherein said first supporting unit is disposed in said holding furnace in line with said inlet opening for receiving said slabs, and said second supporting unit, comprising a conveyor system disposed forward of said furnace, in line with said outlet opening for receiving slabs transferred from said first supporting unit by said reciprocating arms.

3. Article transfer mechanism comprising, in combination, first and second article supporting units, each consisting of a series of laterally spaced, parallel supports, the supports of each unit being also parallel with those of the other unit and longitudinally spaced therefrom, the spaces between the supports of respective units forming longitudinally aligned passageways, a transfer unit comprising a series of article engaging arms parallel with the supports of said units and laterally spaced for travel through the spaces between respective units from one unit to and from the other, the arms of said transfer unit being collectively pivoted at one end adjacent said first unit, on a common shaft having an axis perpendicular to the longitudinal axes of said supports, the opposite ends of respective pivoted arms being eccentrically supported on a crankshaft for vertical adjustment, whereby said opposite ends of said arms may be selectively elevated or lowered between the supports of said units, the upper edges of said arms intersecting the planes of said supports to engage and correspondingly elevate or lower articles resting on respective supports.

4. Article transfer mechanism comprising adjacent first and second article supporting units, each consisting of a series of laterally spaced supports, the supports of both units being parallel and each longitudinally spaced with respect to those of the other unit, a transfer unit comprising a series of laterally spaced transfer arms parallel with each other and with the supports of said supporting units, said transfer arms being respectively coaxially fulcrumed adjacent their outer ends on the upper ends of a correspondingly spaced series of actuating levers, the lower ends of the latter being keyed to a common driveshaft having an axis perpendicular to the longitudinal axes of said arms, the inner ends of said arms being pivotally supported at points longitudinally spaced from respective fulcrums on the upper ends of elevating levers, the lower ends of the latter being eccentrically mounted on a crankshaft whose axis of rotation is parallel with that of said driveshaft, the lateral spacing of said transfer arms being such as to position respective arms in line for movement to and fro through the spaces between the supports of respective supporting units, the eccentric mountings of said elevating arms, when in their lowermost positions, restricting the movement of the inner ends of said arms to an arc which normally terminates below the planes of respective supports, means for reversibly rotating said driveshaft to collectively reciprocate said arms through the aforesaid arc, and means for rotating said crankshaft to selectively elevate or lower the inner ends of said arms on their respective fulcrums, intersecting the upper planes of said spaced supports, whereby an article resting on one supporting unit may be elevated and transferred to the other supporting unit and thereafter lowered and deposited on the latter.

References Cited
UNITED STATES PATENTS

| | | | |
|---|---|---|---|
| 1,468,944 | 9/1923 | Hogenson | 214—26 |
| 2,024,949 | 12/1935 | Schefe. | |
| 2,061,358 | 11/1936 | Hunter et al. | |
| 3,243,059 | 3/1966 | Kalberkamp | 214—26 |

FOREIGN PATENTS

| | | |
|---|---|---|
| 1,193,078 | 5/1965 | Germany. |

ROBERT G. SHERIDAN, *Primary Examiner.*